US012211430B2

(12) United States Patent
Park et al.

(10) Patent No.: US 12,211,430 B2
(45) Date of Patent: Jan. 28, 2025

(54) PIXEL CIRCUIT AND DISPLAY APPARATUS HAVING THE SAME

(71) Applicant: Samsung Display Co., LTD., Yongin-si (KR)

(72) Inventors: Junhyun Park, Suwon-si (KR); Hyeongseok Kim, Hwaseong-si (KR); Jangmi Kang, Seoul (KR); Minjae Jeong, Hwaseong-si (KR); Mukyung Jeon, Ulsan (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/372,618

(22) Filed: Sep. 25, 2023

(65) Prior Publication Data

US 2024/0013712 A1 Jan. 11, 2024

Related U.S. Application Data

(62) Division of application No. 17/889,303, filed on Aug. 16, 2022, now Pat. No. 11,804,171.

(30) Foreign Application Priority Data

Sep. 24, 2021 (KR) ........................ 10-2021-0126729

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01)

(58) Field of Classification Search
CPC ............ G09G 3/32; G09G 2300/0842; G09G 2310/0267; G09G 2310/0275
See application file for complete search history.

(56) References Cited

U.S. PATENT DOCUMENTS 7,414,599 B2 8/2008 Chung et al.
11,049,458 B1 * 6/2021 Fan ..................... G09G 3/3266
(Continued)

FOREIGN PATENT DOCUMENTS

KR 10-0560780 3/2006
KR 10-0698709 3/2007

OTHER PUBLICATIONS

Non-Final Office Action dated Mar. 3, 2023, issued to U.S. Appl. No. 17/889,303.

(Continued)

*Primary Examiner* — Benjamin C Lee
*Assistant Examiner* — Nathan P Brittingham
(74) *Attorney, Agent, or Firm* — KILE PARK REED & HOUTTEMAN PLLC

(57) ABSTRACT

A pixel circuit includes a light emitting element, a driving switching element, a storage capacitor, a data voltage applying switching element and a first leakage compensation switching element. The driving switching element is configured to apply a driving current to the light emitting element. The storage capacitor is connected to a control electrode of the driving switching element. The data voltage applying switching element is configured to apply a data voltage to the storage capacitor. The first leakage compensation switching element is disposed between the storage capacitor and the data voltage applying switching element.

7 Claims, 15 Drawing Sheets

(56) References Cited

U.S. PATENT DOCUMENTS

| | | | | |
|---|---|---|---|---|
| 2014/0168195 | A1* | 6/2014 | Kumeta | G09G 3/3233 345/212 |
| 2018/0005572 | A1* | 1/2018 | Ka | G09G 3/3233 |
| 2021/0104196 | A1* | 4/2021 | Yuan | G09G 3/3258 |
| 2021/0264862 | A1* | 8/2021 | Wang | G09G 3/3275 |

OTHER PUBLICATIONS

Notice of Allowance dated Jun. 26, 2023, issued to U.S. Appl. No. 17/889,303.

* cited by examiner

PIXEL CIRCUIT AND DISPLAY APPARATUS HAVING THE SAME

CROSS REFERENCE TO RELATED APPLICATIONS

This application is a division of U.S. patent application Ser. No. 17/889,303, filed on Aug. 16, 2022, now U.S. Pat. No. 11,804,171, issued Oct. 31, 2023, which claims priority from and the benefit of Korean Patent Application No. 10-2021-0126729, filed on Sep. 24, 2021, which is hereby incorporated by reference for all purposes as if fully set forth herein.

BACKGROUND

Field

Embodiments of the invention relate generally to a pixel circuit and a display apparatus including the pixel circuit and, more specifically, to a pixel circuit for reducing a current leakage to enhance a display quality and a display apparatus including the pixel circuit.

Discussion of the Background

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver, and the emission driver.

In a display apparatus supporting a low frequency driving and a variable frequency driving, a flicker may occur by a luminance difference according to a driving frequency due to a current leakage in a pixel circuit or a change of the driving frequency that may be unintentionally recognized by a user by the luminance difference according to the driving frequency, leading to a less-than-ideal image display.

The above information disclosed in this Background section is only for understanding of the background of the inventive concepts, and, therefore, it may contain information that does not constitute prior art.

SUMMARY

Embodiments consistent with one or more inventive concepts provide a pixel circuit capable of reducing a current leakage and enhancing a display quality in a display apparatus supporting a low frequency driving and a variable frequency driving.

Embodiments consistent with one or more inventive concepts also provide a display apparatus including the pixel circuit.

Additional features of the inventive concepts will be set forth in the description that follows, and in part will be apparent from the description, or may be learned by practice of the inventive concepts.

In an embodiment, a pixel circuit includes a light emitting element, a driving switching element, a storage capacitor, a data voltage applying switching element and a first leakage compensation switching element. The driving switching element is configured to apply a driving current to the light emitting element. The storage capacitor is connected to a control electrode of the driving switching element. The data voltage applying switching element is configured to apply a data voltage to the storage capacitor. The first leakage compensation switching element is disposed between the storage capacitor and the data voltage applying switching element.

In an embodiment, the driving switching element and the data voltage applying switching element may be P-type transistors. The first leakage compensation switching element may be an N-type transistor.

In an embodiment, the pixel circuit may further include a second leakage compensation switching element including an input electrode connected to the control electrode of the driving switching element and a control electrode connected to the control electrode of the first leakage compensation switching element.

In an embodiment, the driving switching element and the data voltage applying voltage may be P-type transistors. The first leakage compensation switching element and the second leakage compensation switching element may be N-type transistors.

In an embodiment, the pixel circuit may further include a data initialization switching element connected to an output electrode of the second leakage compensation switching element and configured to apply an initialization voltage to the output electrode of the second leakage compensation switching element.

In an embodiment, the pixel circuit may further include a threshold voltage compensation switching element disposed between an output electrode of the data initialization switching element and an output electrode of the driving switching element.

In an embodiment, the pixel circuit may further include a light emitting element initialization switching element connected to an anode electrode of the light emitting element.

In an embodiment, a control signal applied to a control electrode of the data initialization switching element may be an N-th data initialization gate signal. A control signal applied to a control electrode of the light emitting element initialization switching element may be an (N+K)-th data initialization gate signal. N is a positive integer and K is a positive integer.

In an embodiment, a control electrode applied to a control electrode of the data initialization switching element may be a data initialization gate signal. A control signal applied to a control electrode of the light emitting element initialization switching element is a light emitting element initialization gate signal different from the data initialization gate signal.

In an embodiment, a light emitting element initialization voltage applied to an input electrode of the light emitting element initialization switching element may be substantially the same as an initialization voltage applied to an input electrode of the data initialization switching element.

In an embodiment, the pixel circuit may further include a reference voltage applying switching element connected to an input electrode of the first leakage compensation switching element.

In an embodiment, the driving switching element and the data voltage applying switching element may be P-type transistors. The first leakage compensation switching element and the reference voltage applying switching element may be N-type transistors.

In an embodiment, a voltage applied to an input electrode of the reference voltage applying switching element may be substantially the same as a voltage applied to an input electrode of the driving switching element.

In an embodiment, the pixel circuit may further include a bias capacitor including a first electrode connected to the control electrode of the driving switching element and a second electrode configured to receive a bias signal.

In an embodiment, a low level of the bias signal may be greater than a low level of a control signal applied to a control electrode of the data voltage applying switching element.

In an embodiment, the bias signal may have a plurality of pulses in a single frame.

In an embodiment, the pixel circuit may further include a reference voltage applying switching element connected to an input electrode of the first leakage compensation switching element. The bias signal may be substantially the same as a control signal applied to a control electrode of the reference voltage applying switching element.

In an embodiment, the pixel circuit may further include a first bias switching element including an input electrode configured to receive a bias voltage and an output electrode connected to an input electrode of the driving switching element and a second bias switching element including an input electrode configured to receive a first power voltage and an output electrode connected to an input electrode of the driving switching element.

In an embodiment, the pixel circuit may further include a data initialization switching element connected to the control electrode of the driving switching element and configured to apply an initialization voltage to the control electrode of the driving switching element. The driving switching element may be a P-type transistor. The data initialization switching element may be an N-type transistor.

In an embodiment, the pixel circuit may further include a threshold voltage compensation switching element disposed between an output electrode of the data initialization switching element and an output electrode of the driving switching element. The threshold voltage compensation switching element may be an N-type transistor.

In an embodiment, a display apparatus includes a display panel, a gate driver, a data driver and an emission driver. The display panel includes a pixel. The gate driver is configured to output a gate signal to the pixel. The data driver is configured to output a data voltage to the pixel. The emission driver is configured to output an emission signal to the pixel. The pixel includes a light emitting element, a driving switching element configured to apply a driving current to the light emitting element, a storage capacitor connected to a control electrode of the driving switching element, a data voltage applying switching element configured to apply the data voltage to the storage capacitor and a first leakage compensation switching element disposed between the storage capacitor and the data voltage applying switching element.

According to the pixel circuit and the display apparatus that includes the pixel circuit, the pixel circuit includes a leakage compensation switching element connected to the storage capacitor so that the current leakage may be reduced in the display apparatus supporting the low frequency driving and the variable frequency driving.

Thus, the flicker may not occur by the luminance difference according to the driving frequency due to the current leakage in the pixel circuit and the change of the driving frequency may not be recognized by the user by the luminance difference according to the driving frequency in the display apparatus supporting the low frequency driving and the variable frequency driving. Therefore, the display quality of the display apparatus supporting the low frequency driving and the variable frequency driving may be enhanced.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

The above and other features and advantages of the inventive concept will become more apparent by describing in detailed embodiments thereof with reference to the accompanying drawings, in which.

DETAILED DESCRIPTION OF THE INVENTIVE CONCEPT

Figure 1:
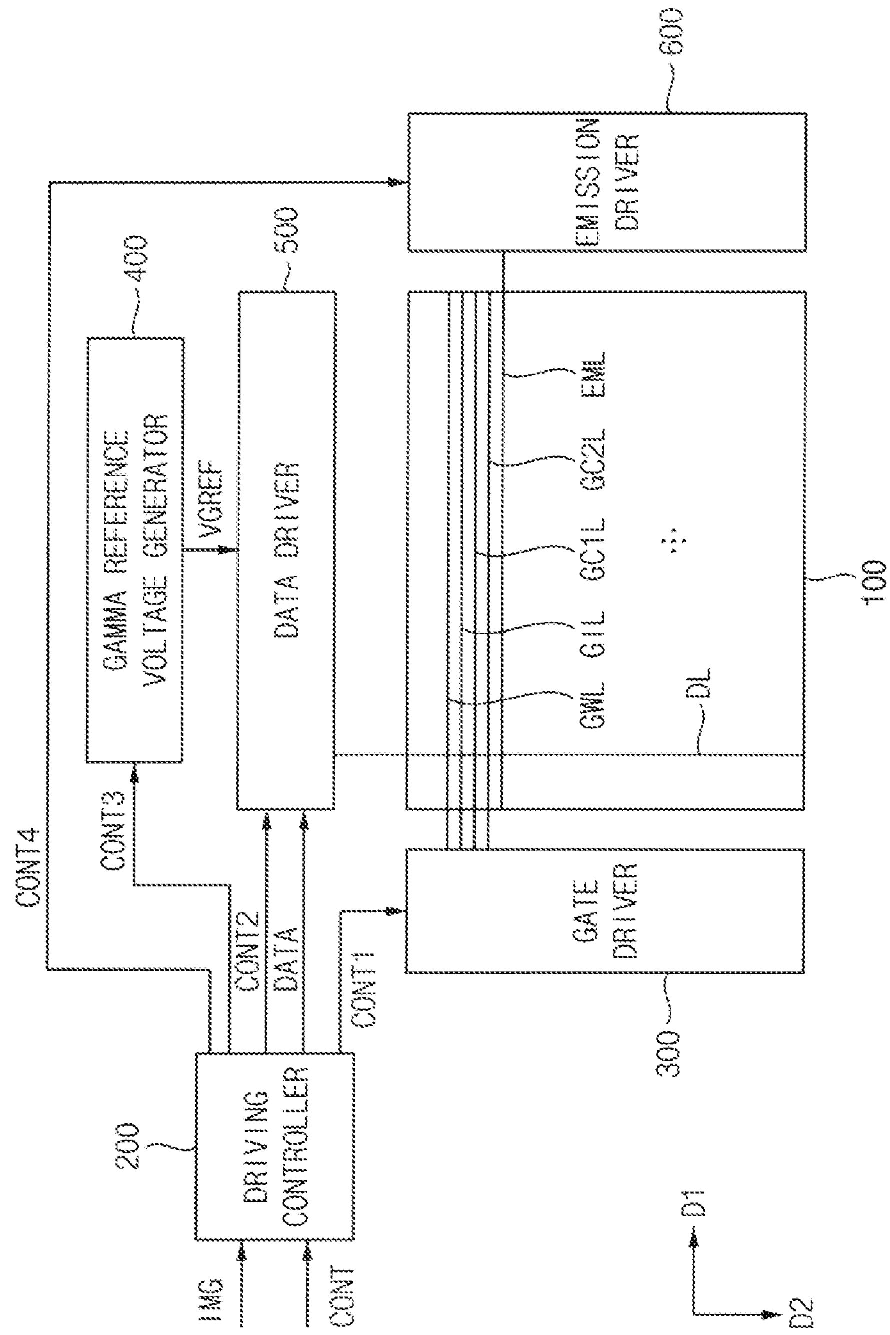
FIG. 1 is a block diagram illustrating a display apparatus according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to that this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, inventive concepts consistent with embodiments of the invention will be explained in detail with reference to the accompanying drawings.

FIG. 1 is a block diagram illustrating a display apparatus according to an embodiment that is constructed according to principles of the invention.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region adjacent to the display region.

The display panel 100 includes a plurality of gate lines GWL, GIL, GC1L and GC2L, a plurality of data lines DL, a plurality of emission lines EML and a plurality of pixels electrically connected to the gate lines GWL, GIL, GC1L and GC2L, the data lines DL and the emission lines EML. The gate lines GWL, GIL, GC1L and GC2L may extend in a first direction D1, the data lines DL may extend in a second direction D2 crossing the first direction D1 and the emission lines EML may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL, GC1L and GC2L in response to the first control signal CONT1 received from the driving controller 200. The gate driver 300 may sequentially output the gate signals to the gate lines GWL, GIL, GC1L and GC2L.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EML in response to the fourth control signal CONT4 received from the driving controller 200. The emission driver 600 may output the emission signals to the emission lines EML.

Although the gate driver 300 is disposed at a first side of the display panel 100 and the emission driver 600 is disposed at a second side of the display panel 100 opposite to the first side in FIG. 1 for convenience of explanation, the embodiment described herein is not be limited thereto. For example, both of the gate driver 300 and the emission driver 600 may be disposed at the first side of the display panel 100. For example, the gate driver 300 and the emission driver 600 may be integrally formed.

Figure 2:
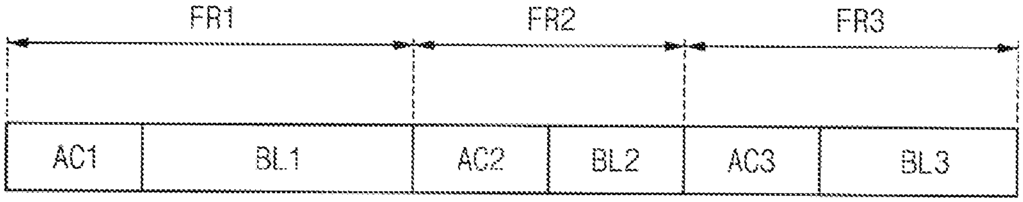
FIG. 2 is a conceptual diagram illustrating a driving frequency of a display panel of FIG. 1.

FIG. 2 is a conceptual diagram illustrating a driving frequency of the display panel 100 of FIG. 1.

Referring to FIGS. 1 and 2, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length substantially the same as a length of the second active period AC2. The first blank period BL1 may have a length different from a length of the second blank period BL2.

The second active period AC2 may have the length substantially the same as a length of the third active period AC3. The second blank period BL2 may have the length different from a length of the third blank period BL3.

The display apparatus supporting the variable frequency driving may include a data writing period in which the data voltage is written to the pixel and a self scan period in which only light emission is operated without writing the data voltage to the pixel. The data writing period may be disposed in the active period AC1, AC2 and AC3. The self scan period may be disposed in the blank period BL1, BL2 and BL3.

Figure 3:
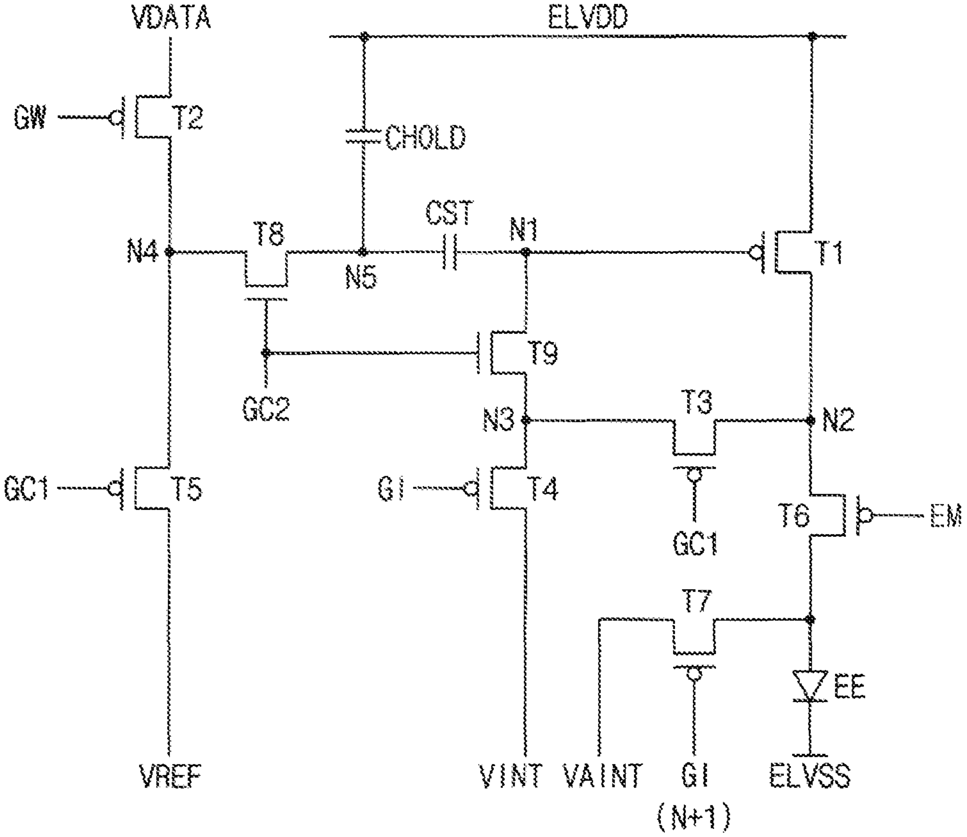
FIG. 3 is a circuit diagram illustrating an example of a pixel of the display panel of FIG. 1.

FIG. 3 is a circuit diagram illustrating an example of a pixel of the display panel 100 of FIG. 1.

Referring to FIGS. 1 to 3, the pixel may include a light emitting element EE, a driving switching element T1 applying a driving current to the light emitting element EE, a storage capacitor CST connected to a control electrode of the driving switching element T1, a data voltage applying switching element T2 applying the data voltage VDATA to the storage capacitor CST and a first leakage compensation switching element T8 disposed between the storage capacitor CST and the data voltage applying switching element T2.

For example, the driving switching element T1 and the data voltage applying switching element T2 may be P-type transistors. The first leakage compensation switching element T8 may be an N-type transistor. For example, the driving switching element T1 and the data voltage applying switching element T2 may be LTPS (low temperature polysilicon) thin film transistors. The first leakage compensation switching element T8 may be an oxide thin film transistor.

The first leakage compensation switching element T8 may be the N-type transistor so that the current leakage at a first electrode of the storage capacitor CST may be reduced in the low frequency driving. Thus, the level of the data voltage VDATA charged at the storage capacitor CST may not be reduced due to the current leakage in the low frequency driving.

The pixel may further include a second leakage compensation switching element T9 including an input electrode connected to the control electrode of the driving switching element T1 and a control electrode connected to a control electrode of the first leakage compensation switching element T8.

For example, the second leakage compensation switching element T9 may be an N-type transistor. For example, the second leakage compensation switching element T9 may be an oxide thin film transistor.

The second leakage compensation switching element T9 may be the N-type transistor so that the current leakage at a second electrode of the storage capacitor CST may be reduced in the low frequency driving. Thus, the level of the data voltage VDATA charged at the storage capacitor CST may not be reduced due to the current leakage in the low frequency driving.

The pixel may further include a data initialization switching element T4 connected to an output electrode of the second leakage compensation switching element T9 and applying an initialization voltage VINT to the output electrode of the second leakage compensation switching element T9.

The pixel may further include a threshold voltage compensation switching element T3 disposed between an output electrode of the data initialization switching element T4 and an output electrode of the driving switching element T1.

The pixel may further include a light emitting element initialization switching element T7 connected to an anode electrode of the light emitting element EE.

In the embodiment described herein, a control signal applied to a control electrode of the data initialization switching element T4 may be an N-th data initialization gate signal GI, a control signal applied to a control electrode of the light emitting element initialization switching element T7 may be an N+K-th data initialization gate signal GI(N+K). Herein, N is a positive integer and K is a positive integer. For example, K may be one. The light emitting element initialization switching element T7 and the data initialization switching element T4 may share signals generated by the same gate driving circuit in different timings so that an increase of resolution due to an additional gate driving circuit and an additional gate signal wiring may be prevented.

In the embodiment, a light emitting element initialization voltage VAINT applied to an input electrode of the light emitting element initialization switching element T7 may be different from the initialization voltage VINT applied to an input electrode of the data initialization switching element T4. By setting the level of the voltage VAINT for initializing the anode electrode of the light emitting element EE and the level of the voltage VINT for initializing the control electrode of the driving switching element T1 differently, the accuracy of initialization of the anode electrode of the light emitting element EE and the accuracy of initialization of the driving switching element T1 may be increased.

The pixel may further include a reference voltage applying switching element T5 connected to an input electrode of the first leakage compensation switching element T8. In the embodiment, the reference voltage applying switching element T5 may be a P-type transistor. In the embodiment, a voltage applied to an input electrode of the reference voltage applying switching element T5 may be a reference voltage VREF.

The pixel may further include an emission switching element T6 disposed between the driving switching element T1 and the light emitting element EE. The emission switching element T6 may connect the driving switching element T1 and the light emitting element EE in response to the emission signal EM.

The pixel may further include a hold capacitor CHOLD including a first electrode receiving a first power voltage ELVDD and a second electrode connected to a first electrode of the storage capacitor CST.

Hereinafter, one implementation of the pixel structure is further explained in detail. The pixel may include a first transistor T1 including a control electrode connected to a first node N1, an input electrode receiving the first power voltage ELVDD and an output electrode connected to a second node N2, a second transistor T2 including a control electrode receiving a data writing gate signal GW, an input electrode receiving the data voltage VDATA and an output electrode connected to a fourth node N4, a third transistor T3 including a control electrode receiving a first compensation gate signal GC1, an input electrode connected to a third node N3 and an output electrode connected to the second node N2, a fourth transistor T4 including a control electrode receiving a data initialization gate signal GI, an input electrode receiving the initialization voltage VINT and an output electrode connected to the third node N3, a fifth transistor T5 including a control electrode receiving the first compensation gate signal GC1, an input electrode receiving the reference voltage VREF and an output electrode connected to the fourth node N4, a sixth transistor T6 including a control electrode receiving the emission signal EM, an input electrode connected to the second node N2 and an output electrode connected to the anode electrode of the light emitting element EE, a seventh transistor T7 including a control electrode receiving a data initialization gate signal GI(N+1) of a next stage, an input electrode receiving the light emitting element initialization voltage VAINT and an output electrode connected to the anode electrode of the light emitting element EE, an eighth transistor T8 including a control electrode receiving a second compensation gate signal GC2, an input electrode connected to the fourth node N4 and an output electrode connected to a fifth node N5, and a ninth transistor T9 including a control electrode receiving the second compensation gate signal GC2, an input electrode connected to the first node N1 and an output electrode connected to the third node N3.

In FIG. 3, GI(N+1) may represent a data initialization gate signal of a next stage and GI may represent a data initialization gate signal of a present stage. Accordingly, GI may be same as GI(N). Other gate signals GW, GC1 and GC2 may denote the gate signals of the present stage. In addition, the emission signal EM may denote the emission signal of the present stage.

The pixel may include the storage capacitor CST including a first electrode connected to the fifth node N5 and a second electrode connected to the first node N1, the hold capacitor CHOLD including a first electrode receiving the first power voltage ELVDD and a second electrode connected to the fifth node N5 and the light emitting element EE including the anode electrode and a cathode electrode receiving a second power voltage ELVSS.

Figure 4:
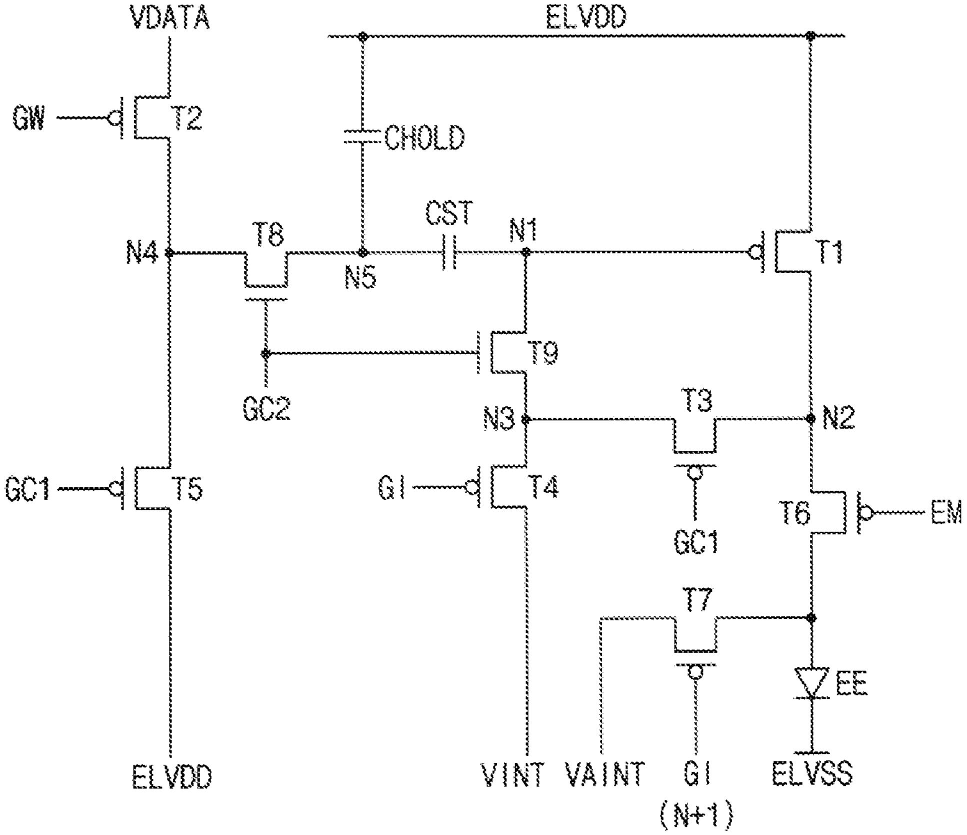
FIG. 4 is a circuit diagram illustrating an example of a pixel of the display panel of FIG. 1.

FIG. 4 is a circuit diagram illustrating an example of a pixel of the display panel of FIG. 1.

The pixel according to the embodiment described with reference to FIG. 4 is substantially the same as the pixel of the previous embodiment explained referring to FIG. 3 except for a voltage applied to an input electrode of a fifth transistor T5. Thus, the same reference numerals will be used to refer to the same or like parts as those described in the previous embodiment of FIG. 3 and any repetitive explanation concerning the above elements will be omitted for sake of brevity.

Referring to FIGS. 1 to 4, the voltage ELVDD applied to the input electrode of the reference voltage applying switching element T5 may be substantially the same as the voltage ELVDD applied to an input electrode of the driving switching element T1. For example, the first power voltage ELVDD may be applied to the input electrode of the reference voltage applying switching element T5. In this case, a wiring of FIG. 3 applying the reference voltage VREF may be omitted so that an increase of a resolution due to the wiring applying the reference voltage VREF may be prevented.

Figure 5:
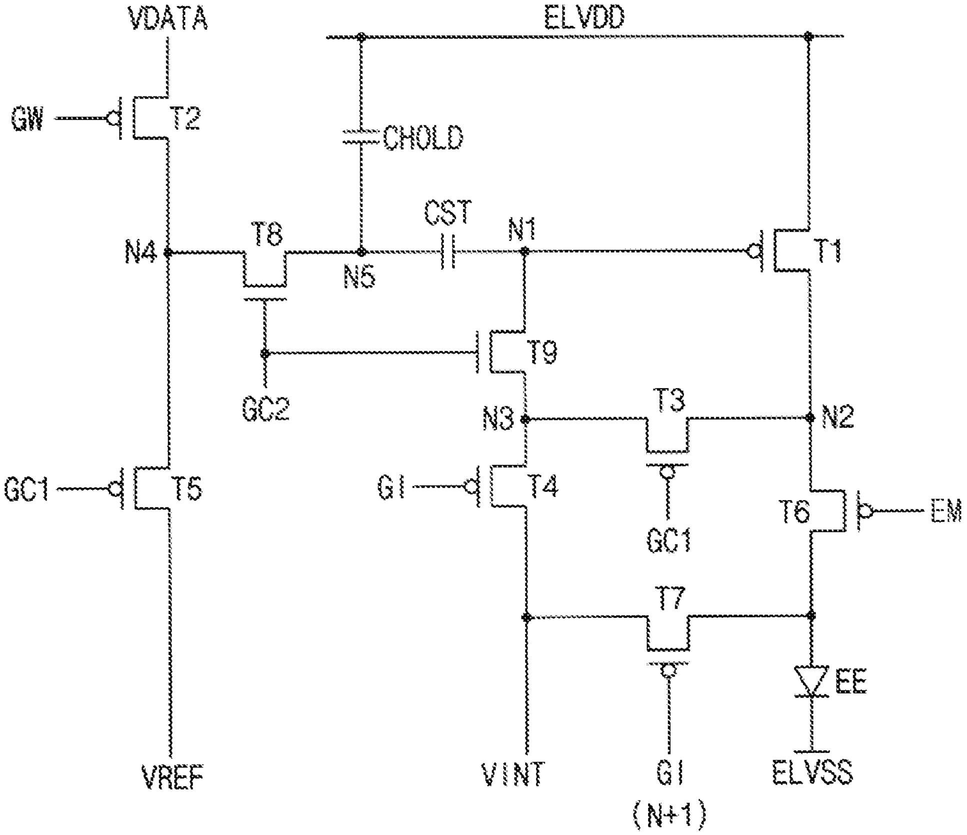
FIG. 5 is a circuit diagram illustrating an example of a pixel of the display panel of FIG. 1.

FIG. 5 is a circuit diagram illustrating an example of a pixel of the display panel of FIG. 1.

The pixel according to the embodiment described with reference to FIG. 5 is substantially the same as the pixel of the previous embodiment explained referring to FIG. 3 except for a voltage applied to an input electrode of a seventh transistor T7. Thus, the same reference numerals will be used to refer to the same or like parts as those described in the previous embodiment of FIG. 3 and any repetitive explanation concerning the above elements will be omitted for sake of brevity.

Referring to FIGS. 1 to 3 and 5, a light emitting element initialization voltage applied to the input electrode of the light emitting element initialization switching element T7 may be substantially the same as an initialization voltage VINT applied to an input electrode of the data initialization switching element T4. In this case, a wiring of FIG. 3 applying the light emitting element initialization voltage VAINT may be omitted so that an increase of a resolution due to the wiring applying the light emitting element initialization voltage VAINT may be prevented.

A concept of the embodiment of FIG. 4 replacing the reference voltage VREF applied to the input electrode of the reference voltage applying switching element T5 with the first power supply voltage ELVDD may be applied to the embodiment of FIG. 5.

Figure 6:
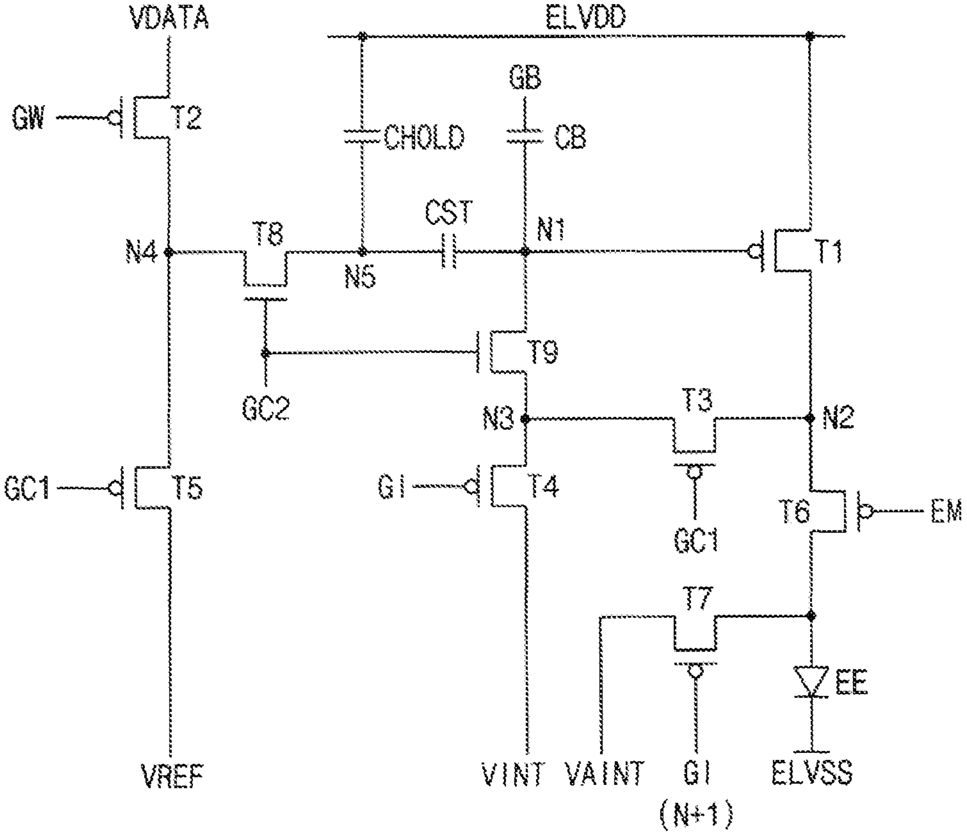
FIG. 6 is a circuit diagram illustrating an example of a pixel of the display panel of FIG. 1.
Figure 7:
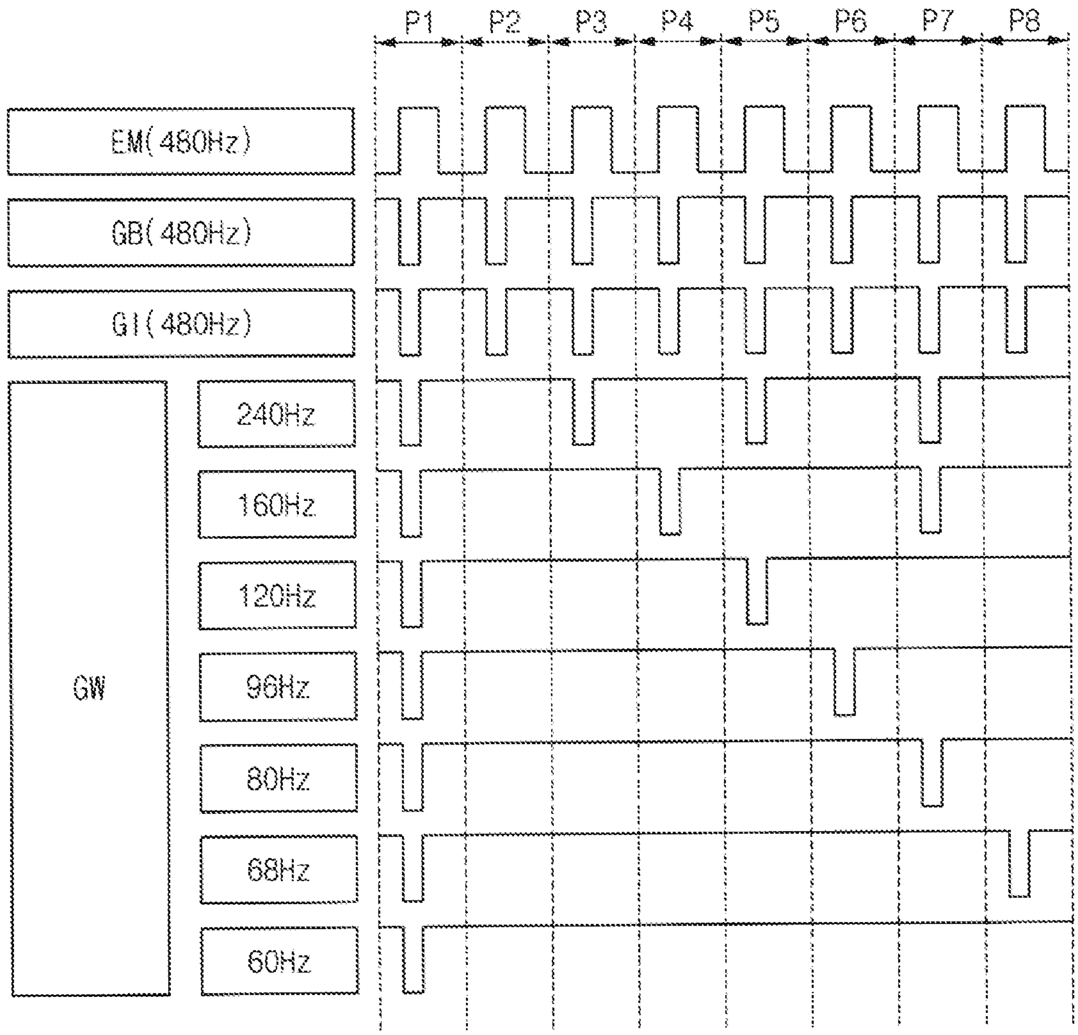
FIG. 7 is a timing diagram illustrating driving signals of the pixel of FIG. 6 when a light emitting frequency is 480 Hz.
Figure 8:
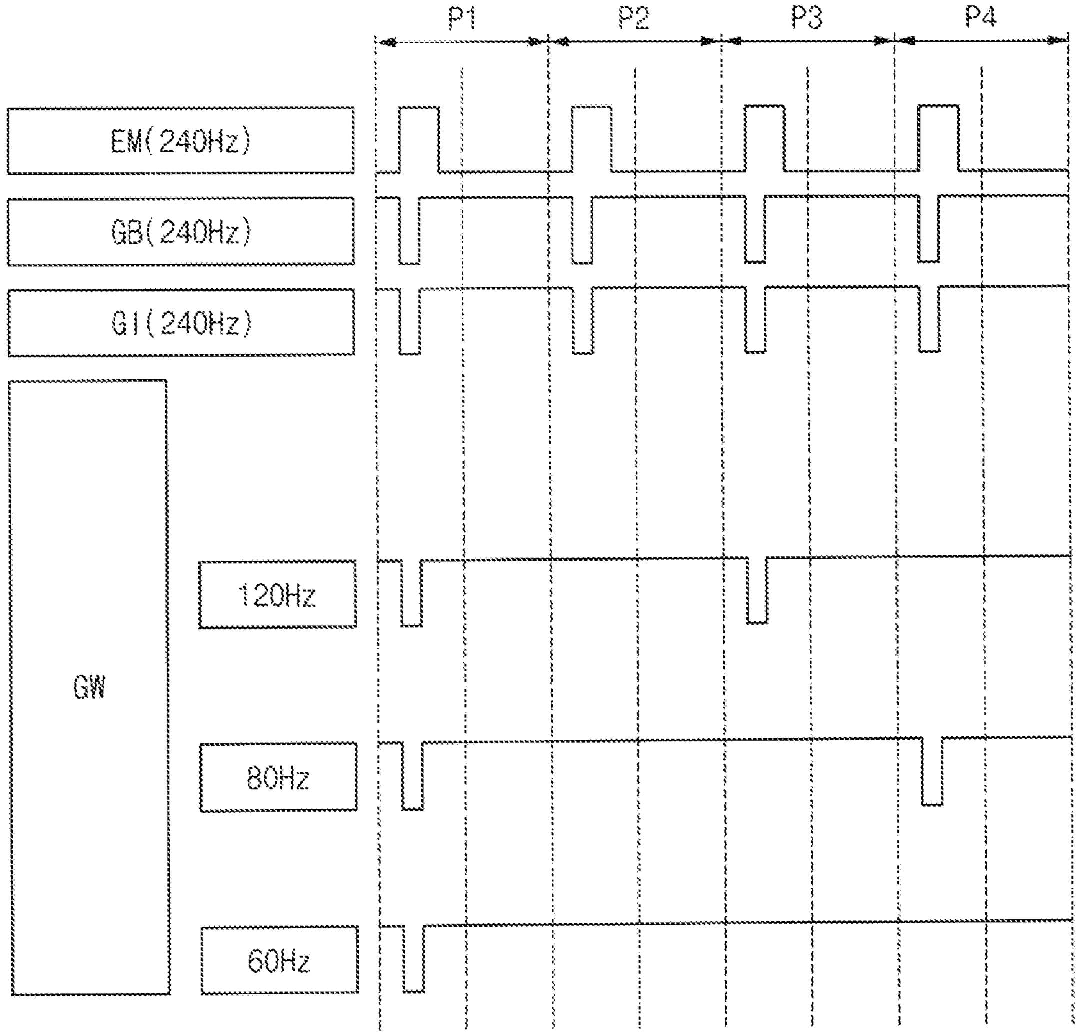
FIG. 8 is a timing diagram illustrating driving signals of the pixel of FIG. 6 when the light emitting frequency is 240 Hz.

FIG. 6 is a circuit diagram illustrating an example of a pixel of the display panel 100 of FIG. 1. FIG. 7 is a timing diagram illustrating driving signals of the pixel of FIG. 6 when a light emitting frequency is 480 Hz. FIG. 8 is a timing diagram illustrating driving signals of the pixel of FIG. 6 when the light emitting frequency is 240 Hz.

The pixel according to the embodiment described with reference to FIG. 6 is substantially the same as the pixel of the previous embodiment explained referring to FIG. 3 except that the pixel further includes a bias capacitor connected to the control electrode of the first transistor T1. Thus, the same reference numerals will be used to refer to the same or like parts as those described in the previous embodiment of FIG. 3 and any repetitive explanation concerning the above elements will be omitted for sake of brevity.

Referring to FIGS. 1 to 3 and 6 to 8, the pixel may further include a bias capacitor CB including a first electrode connected to the control electrode of the driving switching element T1 and a second electrode receiving a bias signal GB.

In the display apparatus supporting the variable frequency driving, a bias operation may be operated to the control electrode of the driving switching element T1 or the input electrode of the driving switching element T1. In the embodiment of FIG. 6, the bias operation may be periodically operated to the control electrode of the driving switching element T1 using the bias capacitor CB.

A concept of the embodiment of FIG. 4 replacing the reference voltage VREF applied to the input electrode of the reference voltage applying switching element T5 with the first power supply voltage ELVDD may be applied to the embodiment of FIG. 6. A concept of the embodiment of FIG. 5 replacing the light emitting element initialization voltage VAINT applied to the input electrode of the light emitting element initialization switching element T7 with the initialization voltage VINT may be applied to the embodiment of FIG. 6.

As shown in FIG. 7, the display panel 100 may be driven in varied frequencies. For example, a maximum driving frequency of the display panel 100 may be 240 Hz. When the display panel 100 is driven in the driving frequency of 240 Hz, the data writing gate signal GW may have active pulses in a first period P1, a third period P3, a fifth period P5 and a seventh period P7 and a data writing operation may be operated in the first period P1, the third period P3, the fifth period P5 and the seventh period P7. When the display panel 100 is driven in the driving frequency of 120 Hz, the data writing gate signal GW may have active pulses in the first period P1 and the fifth period P5 and a data writing operation may be operated in the first period P1 and the fifth period P5.

When the display panel 100 is driven in the driving frequency of 240 Hz, a light emitting operation (EM) of the light emitting element EE may be operated in 480 Hz, an initialization operation (GI) of the light emitting element EE may be operated in 480 Hz and a bias operation (GB) of the driving switching element T1 may be operated in 480 Hz.

When the display panel 100 is driven in 240 Hz and the light emitting operation is driven in 480 Hz as explained above, the display panel 100 may be referred to operate in two cycles.

When the display panel 100 is driven in the driving frequency of 120 Hz, the light emitting operation (EM) of the light emitting element EE may be operated in 480 Hz, the initialization operation (GI) of the light emitting element EE may be operated in 480 Hz and the bias operation (GB) of the driving switching element T1 may be operated in 480 Hz.

When the display panel 100 is driven in 120 Hz and the light emitting operation is driven in 480 Hz as explained above, the display panel 100 may be referred to operate in four cycles.

In the display apparatus supporting the variable frequency driving, a driving sequence of the display panel 100 may include a data writing period and a self scan period. In the data writing period, the data voltage may be written to the pixel. In the self scan period, the data voltage may not be written to the pixel and only light emission may be operated. In the self scan period, the data voltage may not be written to the pixel but the light emitting operation (EM) of the light emitting element EE, the initialization operation (GI) of the light emitting element EE and the bias operation (GB) of the driving switching element T1 may be operated. The first period P1 of FIG. 7 is an example of the data writing period and the second period P2 of FIG. 7 is an example of the self scan period.

As shown in FIG. 8, the display panel 100 may be driven in varied frequencies. For example, a maximum driving frequency of the display panel 100 may be 120 Hz. When the display panel 100 is driven in the driving frequency of 120 Hz, the data writing gate signal GW may have active pulses in a first period P1 and a third period P3 and a data writing operation may be operated in the first period P1 and the third period P3. When the display panel 100 is driven in the driving frequency of 800 Hz, the data writing gate signal GW may have active pulses in the first period P1 and a fourth period P4 and a data writing operation may be operated in the first period P1 and the fourth period P4.

Figure 9:
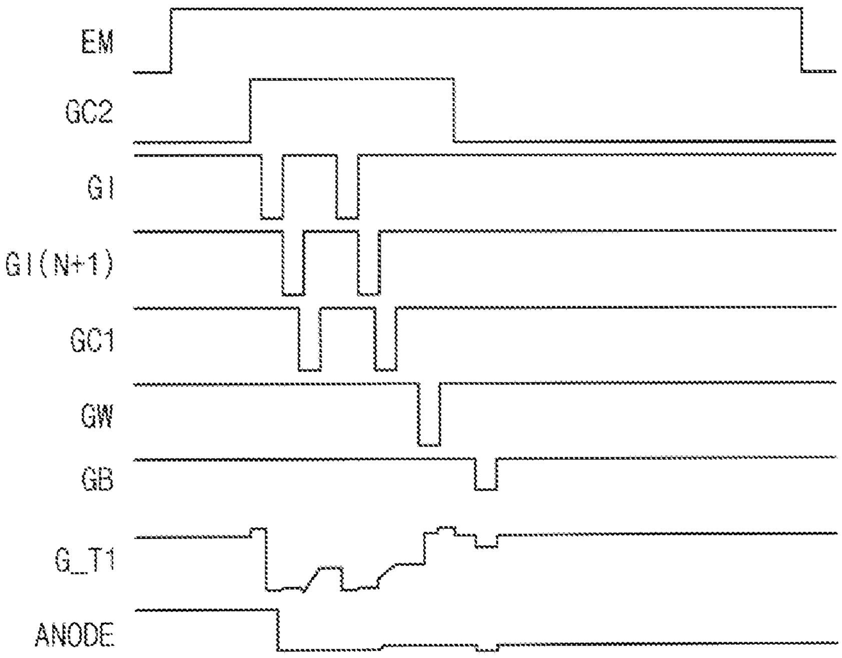
FIG. 9 is a timing diagram illustrating an example of input signals applied to the pixel of FIG. 6 and a node signal of the pixel of FIG. 6 in a data writing period.
Figure 10:
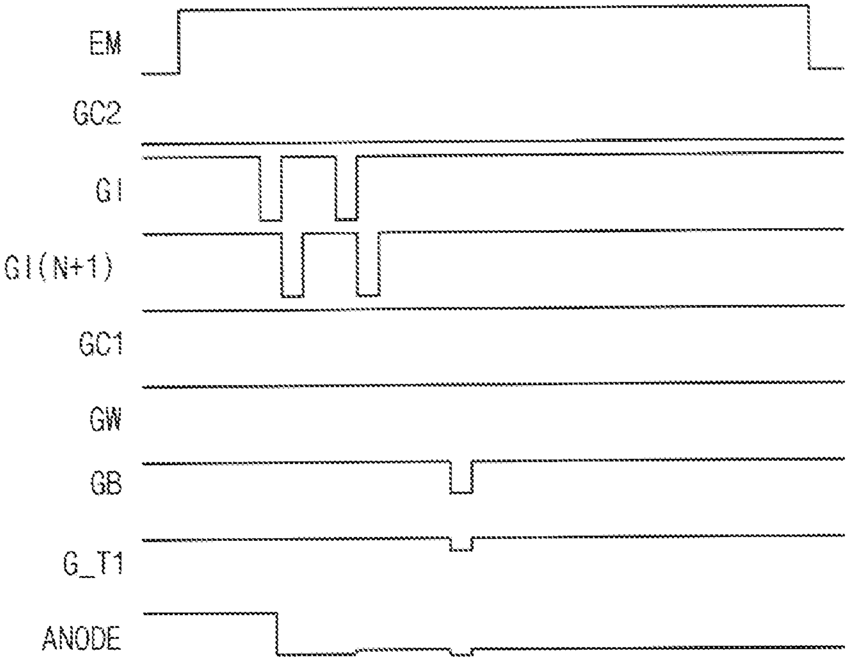
FIG. 10 is a timing diagram illustrating an example of input signals applied to the pixel of FIG. 6 and a node signal of the pixel of FIG. 6 in a self scan period.

FIG. 9 is a timing diagram illustrating an example of input signals applied to the pixel of FIG. 6 and a node signal of the pixel of FIG. 6 in the data writing period. FIG. 10 is a timing diagram illustrating an example of input signals applied to the pixel of FIG. 6 and a node signal of the pixel of FIG. 6 in the self scan period.

In FIG. 9, when the emission signal EM has a high level, the sixth transistor T6 may be turned off and accordingly, the light emitting element EE may not emit the light. In contrast, when the emission signal EM is changed to a low level, the sixth transistor T6 may be turned on and accordingly, the light emitting element EE may emit the light.

The second compensation gate signal GC2 is applied to the control electrode of the eighth transistor T8 and the control electrode of the ninth transistor T9. When the second compensation gate signal GC2 has a high level, the eighth transistor T8 and the ninth transistor T9 may be turned on.

The data initialization gate signal GI is applied to the control electrode of the fourth transistor T4. When the data initialization gate signal GI has a low level, the fourth transistor T4 may be turned on and the initialization voltage VINT may be applied to the control electrode of the first transistor T1 through the fourth transistor T4 and the ninth transistor T9.

The data initialization gate signal GI(N+1) of the next stage is applied to the control electrode of the seventh transistor T7. When the data initialization gate signal GI(N+1) of the next stage has a low level, the seventh transistor T7 may be turned on and accordingly, the light emitting element initialization voltage VAINT may be applied to the anode electrode of the light emitting element EE through the seventh transistor T7.

The first compensation gate signal GC1 is applied to the control electrode of the third transistor T3 and the control electrode of the fifth transistor T5. When the first compensation gate signal GC1 has a low level, the third transistor T3 may be turned on and accordingly, a threshold voltage of the first transistor T1 may be compensated through the third transistor T3 and the ninth transistor T9. When the first compensation gate signal GC1 has the low level, the fifth transistor T5 may be turned on and accordingly, the reference voltage VREF may be applied to the fifth node N5 through the fifth transistor T5 and the eighth transistor T8.

The data writing gate signal GW is applied to the control electrode of the second transistor T2. When the data writing gate signal GW has a low level, the second transistor T2 may be turned on and accordingly, the data voltage VDATA may be applied to the fifth node N5 through the second transistor T2 and the eighth transistor T8.

In the embodiment described with reference to FIG. 9, the bias signal GB may be applied to the second electrode of the bias capacitor CB. When the bias signal GB is applied to the second electrode of the bias capacitor CB, the bias operation may be operated to the control electrode of the driving switching element T1.

A degree of the bias of the driving switching element T1 is determined according to the level of the bias signal GB so that the low level of the bias signal GB may not be the same as the low level of the data writing gate signal GW. For example, the low level of the bias signal GB may be greater than the low level of the data writing gate signal GW that is applied to the control electrode of the data voltage writing switching element T2.

In contrast, the low level of the data writing gate signal GW, the low level of the first compensation gate signal GC1 and the low level of the data initialization gate signal GI may be substantially the same as one another.

In FIG. 9, G_T1 may represent a voltage level of the control electrode of the driving switching element T1 and ANODE may represent a voltage level of the anode electrode of the light emitting element EE.

In FIG. 9, the data initialization gate signal GI and the first compensation gate signal GC1 have two low pulses so that the data initialization operation, the light emitting element initialization operation and the compensation operation of the threshold voltage of the driving switching element T1 may be operated twice. Although the data initialization gate signal GI and the first compensation gate signal GC1 have two low pulses in FIG. 9, the embodiment described herein may not be limited thereto. Alternatively, the data initialization gate signal GI and the first compensation gate signal GC1 may have one low pulse or three or more low pulses.

FIG. 10 represents the self scan period so that the first compensation gate signal GC1, the second compensation gate signal GC2 and the data writing gate signal GW may have inactive level during the self scan period. For example, the inactive level of the first compensation gate signal GC1 and the data writing gate signal GW may be a high level and the inactive level of the second compensation gate signal GC2 may be a low level.

The data initialization gate signal GI and the data initialization gate signal GI(N+1) of the next stage may have active pulses in the self scan period. When the data initialization gate signal GI(N+1) of the next stage has the active pulse, the seventh transistor T7 may be turned on and accordingly, the light emitting element initialization voltage VAINT may be applied to the anode electrode of the light emitting element EE through the seventh transistor T7.

Even though the data initialization gate signal GI has the active pulse, the second compensation gate signal GC2 has the inactive level in the self scan period. Thus, even when the fourth transistor T4 is turned on, the initialization voltage VINT is not applied to the first node N1 in the self scan period since the ninth transistor T9 is turned off.

In the embodiment described with reference to FIG. 10, the bias signal GB is applied to the second electrode of the bias capacitor CB. When the bias signal GB is applied to the second electrode of the bias capacitor CB, the bias operation may be operated to the control electrode of the driving switching element T1.

Figure 11:
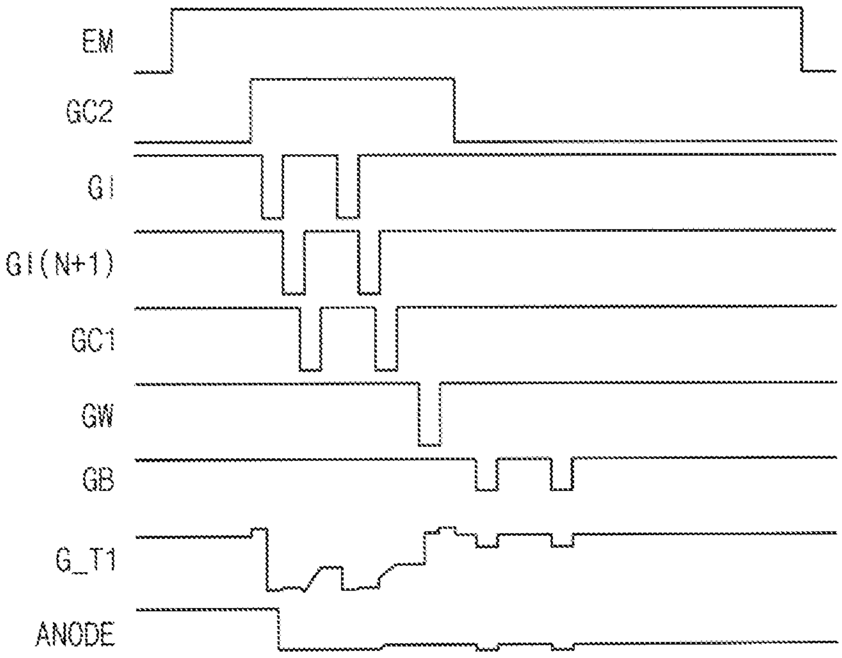
FIG. 11 is a timing diagram illustrating an example of input signals applied to the pixel of FIG. 6 and a node signal of the pixel of FIG. 6 in the data writing period.
Figure 12:
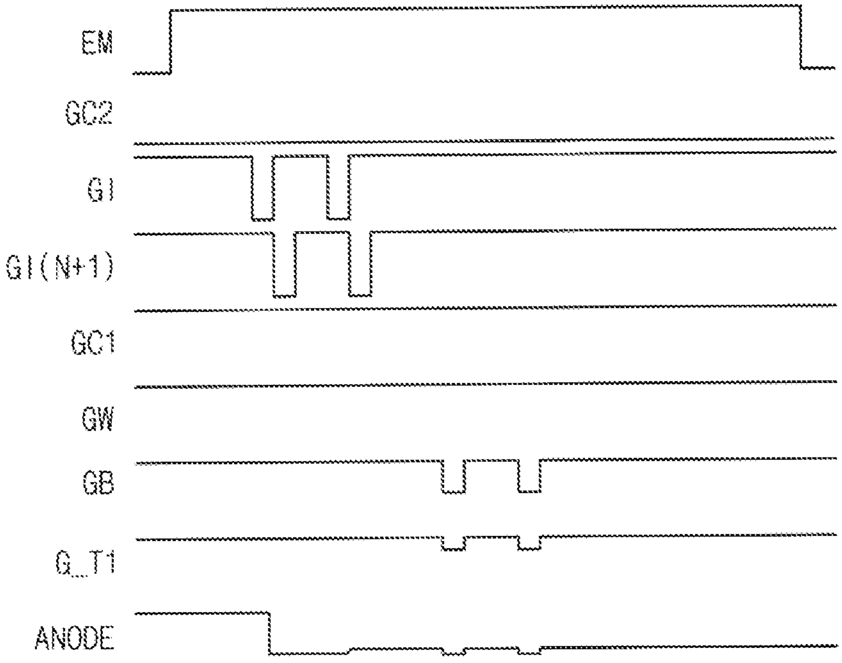
FIG. 12 is a timing diagram illustrating an example of input signals applied to the pixel of FIG. 6 and a node signal of the pixel of FIG. 6 in the self scan period.

FIG. 11 is a timing diagram illustrating an example of input signals applied to the pixel of FIG. 6 and a node signal of the pixel of FIG. 6 in the data writing period. FIG. 12 is a timing diagram illustrating an example of input signals applied to the pixel of FIG. 6 and a node signal of the pixel of FIG. 6 in the self scan period.

The input signals and the node signals of the embodiment of FIG. 6 is substantially the same as the input signals and the node signals of the previous embodiment explained referring to FIGS. 9 and 10 except for the number of the pulses of the bias signal GB. Thus, the same reference numerals will be used to refer to the same or like parts as those described in the previous embodiment of FIGS. 9 and 10 and any repetitive explanation concerning the above elements will be omitted for sake of brevity.

As shown in FIGS. 11 and 12, the bias signal GB may have a plurality of pulses in a single frame.

In FIGS. 11 and 12, the bias signal GB has two low pulses so that the bias operation may be operated twice. Although the bias signal GB has two low pulses in FIG. 11, the embodiment described herein may not be limited thereto. Alternatively, the bias signal GB may have three or more low pulses.

Figure 13:
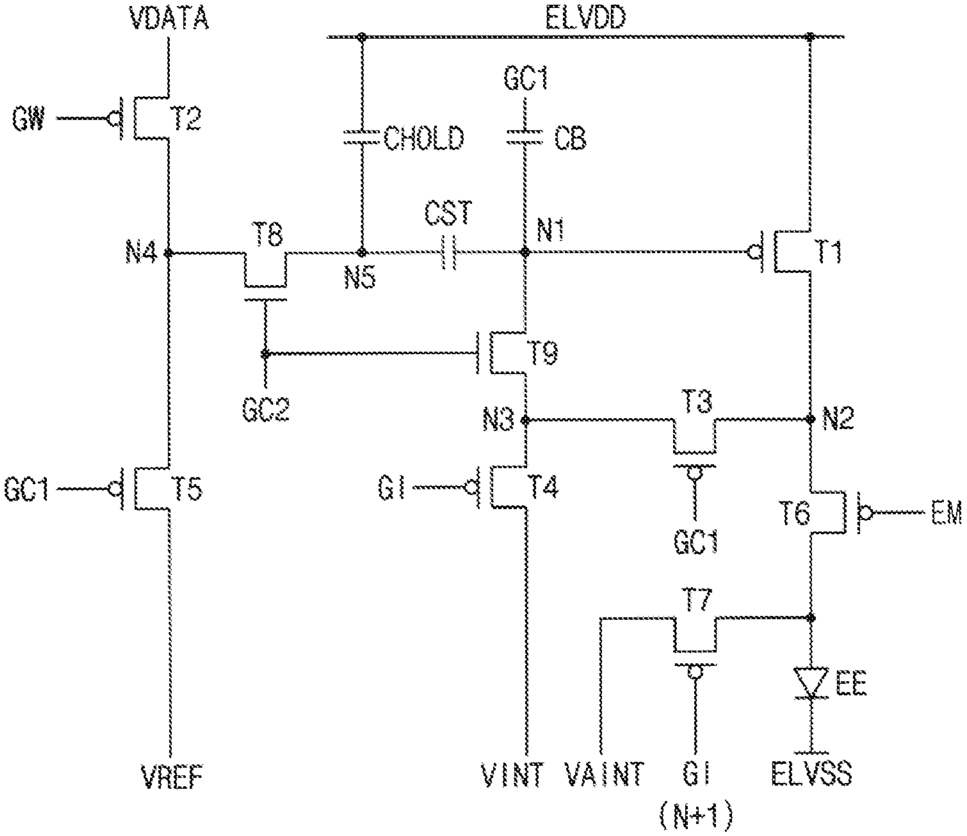
FIG. 13 is a circuit diagram illustrating an example of a pixel of the display panel of FIG. 1.

FIG. 13 is a circuit diagram illustrating an example of a pixel of the display panel 100 of FIG. 1.

The pixel according to the embodiment of FIG. 13 is substantially the same as the pixel of the previous embodiment explained referring to FIG. 6 except for the voltage applied to the bias capacitor. Thus, the same reference numerals will be used to refer to the same or like parts as those described in the previous embodiment of FIG. 6 and any repetitive explanation concerning the above elements will be omitted for sake of brevity.

Referring to FIGS. 1, 2, 6 and 13, the pixel may further include a bias capacitor CB including a first electrode connected to the control electrode of the driving switching element T1 and a second electrode receiving a bias signal GC1.

In the embodiment of FIG. 13, the bias signal GC1 may be substantially the same as the control signal applied to the control electrode of the reference voltage applying switching element T5. In this case, a gate driving circuit of FIG. 6 generating the bias signal GB and a wiring of FIG. 6 applying the bias signal GB may be omitted so that an increase of a resolution due to the additional bias signal GB may be prevented.

A concept of the embodiment of FIG. 4 replacing the reference voltage VREF applied to the input electrode of the reference voltage applying switching element T5 with the first power supply voltage ELVDD may be applied to the embodiment of FIG. 13. A concept of the embodiment of FIG. 5 replacing the light emitting element initialization voltage VAINT applied to the input electrode of the light emitting element initialization switching element T7 with the initialization voltage VINT may be applied to the embodiment of FIG. 13.

Figure 14:
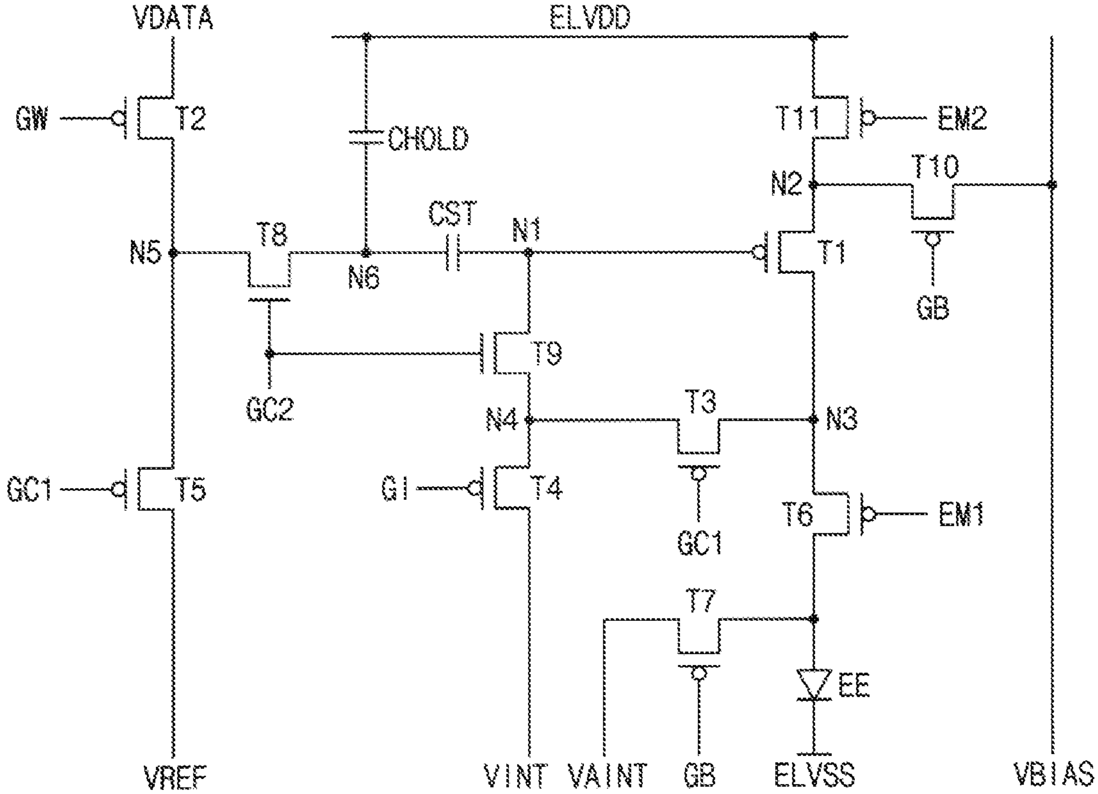
FIG. 14 is a circuit diagram illustrating an example of a pixel of the display panel of FIG. 1.
Figure 15:
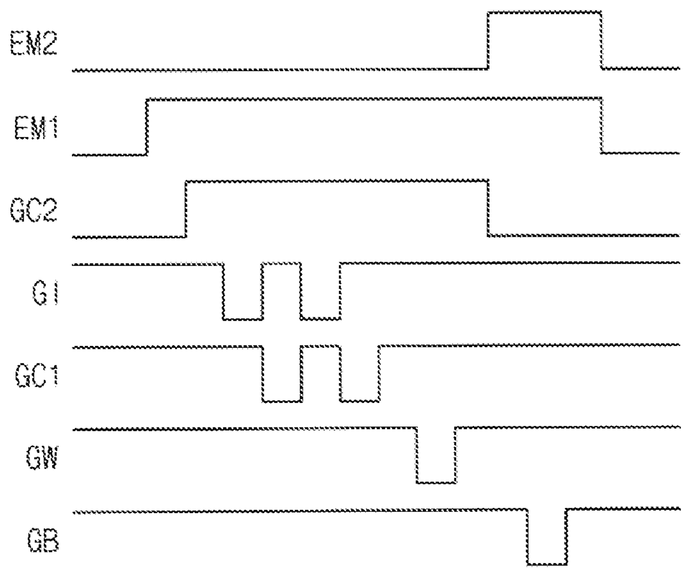
FIG. 15 is a timing diagram illustrating an example of input signals applied to the pixel of FIG. 14 and a node signal of the pixel of FIG. 14 in the data writing period.
Figure 16:
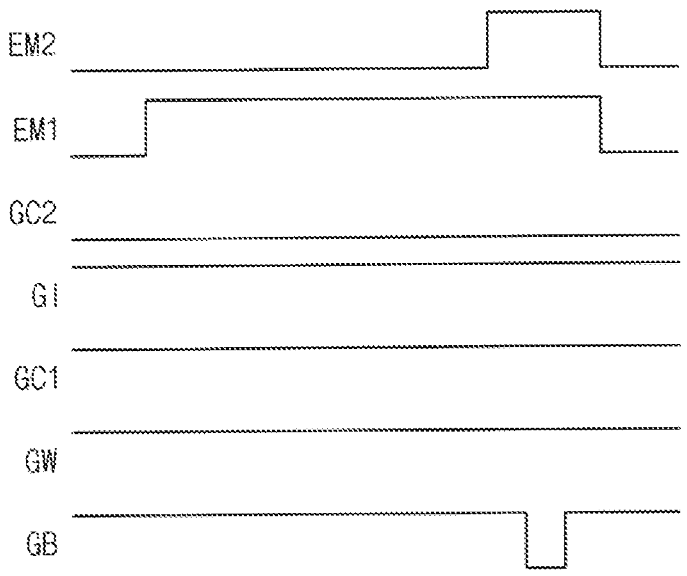
FIG. 16 is a timing diagram illustrating an example of input signals applied to the pixel of FIG. 14 and a node signal of the pixel of FIG. 14 in the self scan period.

FIG. 14 is a circuit diagram illustrating an example of a pixel of the display panel 100 of FIG. 1. FIG. 15 is a timing diagram illustrating an example of input signals applied to the pixel of FIG. 14 and a node signal of the pixel of FIG. 14 in the data writing period. FIG. 16 is a timing diagram illustrating an example of input signals applied to the pixel of FIG. 14 and a node signal of the pixel of FIG. 14 in the self scan period.

The pixel according to the embodiment of FIG. 14 is substantially the same as the pixel of the previous embodiment explained referring to FIG. 3 except that the pixel further includes a first bias switching element and a second bias switching element. Thus, the same reference numerals will be used to refer to the same or like parts as those described in the previous embodiment of FIG. 3 and any repetitive explanation concerning the above elements will be omitted for sake of brevity.

Referring to FIGS. 1 to 3 and 14 to 16, the pixel may further include a first bias switching element T10 including an input electrode receiving a bias voltage VBIAS and an output electrode connected to an input electrode N2 of the driving switching element T1 and a second bias switching element T11 including an input electrode receiving a first power voltage ELVDD and an output electrode connected to the input electrode N2 of the driving switching element T1.

A bias signal GB may be applied to a control electrode of the first bias switching element T10. A second emission signal EM2 may be applied to a control electrode of the second bias switching element T11.

A first emission signal EM1 may be applied to a control electrode of the sixth switching element T6.

In the embodiment of FIG. 14, the bias signal GB may be applied to a control electrode of the seventh switching element T7. In the embodiment of FIG. 14, a control signal applied to a control electrode of the data initialization switching element T4 may be a data initialization gate signal GI and the control signal GB applied to the control electrode of the light emitting element initialization switching element T7 may be a light emitting element initialization gate signal GB that is different from the data initialization gate signal GI. Herein, the light emitting element initialization gate signal GB may be substantially the same as the bias signal GB.

A concept of the embodiment of FIG. 4 replacing the reference voltage VREF applied to the input electrode of the reference voltage applying switching element T5 with the first power supply voltage ELVDD may be applied to the embodiment of FIG. 14. A concept of the embodiment of FIG. 5 replacing the light emitting element initialization voltage VAINT applied to the input electrode of the light emitting element initialization switching element T7 with the initialization voltage VINT may be applied to the embodiment of FIG. 14.

In FIG. 15, when the first emission signal EM1 has a high level, the sixth transistor T6 may be turned off and accordingly, the light emitting element EE may not emit the light. In contrast, when the first emission signal EM1 is changed to a low level, the sixth transistor T6 may be turned on and accordingly, the light emitting element EE may emit the light.

The second compensation gate signal GC2 is applied to the control electrode of the eighth transistor T8 and the control electrode of the ninth transistor T9. When the second compensation gate signal GC2 has a high level, the eighth transistor T8 and the ninth transistor T9 may be turned on.

The data initialization gate signal GI is applied to the control electrode of the fourth transistor T4. When the data initialization gate signal GI has a low level, the fourth transistor T4 may be turned on and the initialization voltage VINT may be applied to the control electrode of the first transistor T1 through the fourth transistor T4 and the ninth transistor T9.

The first compensation gate signal GC1 is applied to the control electrode of the third transistor T3 and the control electrode of the fifth transistor T5. When the first compensation gate signal GC1 has a low level, the third transistor T3 may be turned on and accordingly, a threshold voltage of the first transistor T1 may be compensated through the third transistor T3 and the ninth transistor T9. When the first compensation gate signal GC1 has the low level, the fifth transistor T5 may be turned on and accordingly, the reference voltage VREF may be applied to the fifth node N5 through the fifth transistor T5 and the eighth transistor T8.

The data writing gate signal GW is applied to the control electrode of the second transistor T2. When the data writing gate signal GW has a low level, the second transistor T2 may be turned on and accordingly, the data voltage VDATA may be applied to the fifth node N5 through the second transistor T2 and the eighth transistor T8.

The bias signal GB is applied to the control electrode of the tenth transistor T10 and the control electrode of the seventh transistor T7. When the bias signal GB has a low level, the tenth transistor T10 may be turned on and accordingly, the bias voltage VBIAS may be applied to the second node N2 through the tenth transistor T10. When the bias signal GB has the low level, the seventh transistor T7 may be turned on and accordingly, the light emitting element initialization voltage VAINT may be applied to the anode electrode of the light emitting element EE through the seventh transistor T7.

The second emission signal EM2 is applied to the control electrode of the eleventh transistor T11. When the second emission signal EM2 has a high level, the eleventh transistor T11 may be turned off. The second emission signal EM2 may turn off the eleventh transistor T11 when the tenth transistor is turned off so that the light emitting element EE may not emit the light when the tenth transistor T10 operates the bias operation.

FIG. 16 represents the self scan period so that the first compensation gate signal GC1, the second compensation gate signal GC2 and the data writing gate signal GW may have inactive level during the self scan period. For example, the inactive level of the first compensation gate signal GC1 and the data writing gate signal GW may be a high level and the inactive level of the second compensation gate signal GC2 may be a low level.

A concept of the embodiment of FIGS. 11 and 12 operating the bias operation of the driving switching element T1 in plural times may be applied to the embodiment of FIG. 16.

Figure 17:
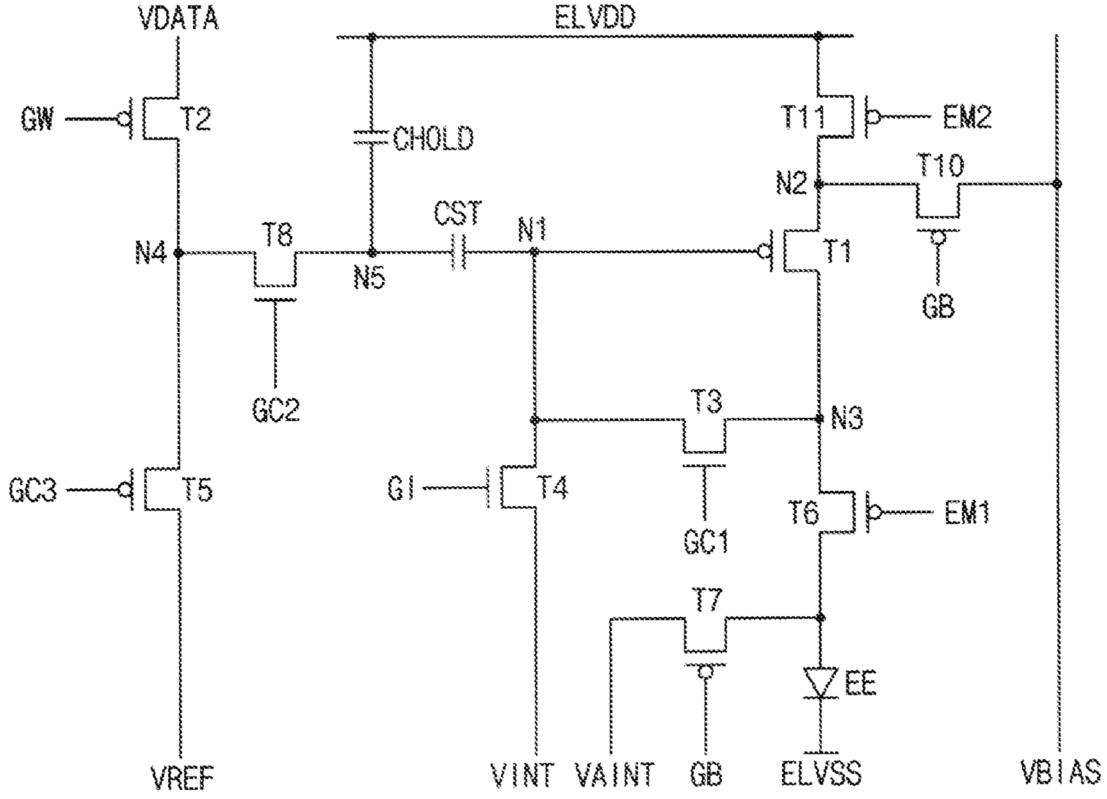
FIG. 17 is a circuit diagram illustrating an example of a pixel of the display panel of FIG. 1.

FIG. 17 is a circuit diagram illustrating an example of a pixel of the display panel of FIG. 1.

The pixel according to the embodiment of FIG. 17 is substantially the same as the pixel of the previous embodiment explained referring to FIG. 14 except that the pixel does not include a ninth transistor T9 and a third transistor T3 and a fourth transistor T4 are formed as the N-type transistor. Thus, the same reference numerals will be used to refer to the same or like parts as those described in the previous embodiment of FIG. 14 and any repetitive explanation concerning the above elements will be omitted for sake of brevity.

Referring to FIGS. 1, 2, 14 and 17, the pixel may include a data initialization switching element T4 connected to a control electrode of a driving switching element T1 and applying an initialization voltage VINT to a control electrode N1 of the driving switching element T1.

Herein, the driving switching element T1 may be a P-type transistor and the data initialization switching element T4 may be an N-type transistor. For example, the driving switching element T1 may be an LTPS (low temperature polysilicon) thin film transistor. The data initialization switching element T4 may be an oxide thin film transistor.

The data initialization switching element T4 may be the N-type transistor so that the current leakage at a second electrode of the storage capacitor CST may be reduced in the low frequency driving. Thus, the level of the data voltage VDATA charged at the storage capacitor CST may not be reduced due to the current leakage in the low frequency driving.

In addition, the pixel may further include a threshold voltage compensation switching element T3 disposed between an output electrode of the data initialization switching element T4 and an output electrode of the driving switching element T1.

Herein, the threshold voltage compensation switching element T3 may be the N-type transistor. The threshold voltage compensation switching element T3 may be the oxide thin film transistor.

The threshold voltage compensation switching element T3 may be the N-type transistor so that the current leakage at the second electrode of the storage capacitor CST may be reduced in the low frequency driving. Thus, the level of the data voltage VDATA charged at the storage capacitor CST may not be reduced due to the current leakage in the low frequency driving.

A first compensation gate signal GC1 may be applied to a control electrode of the threshold voltage compensation switching element T3 and a third compensation gate signal GC3 different from the first compensation gate signal GC1 may be applied to a control electrode of the fifth transistor T5. In the embodiment of FIG. 17, the fifth transistor T5 is the P-type transistor and the third transistor T3 is the N-type transistor so that the control signal of the third transistor T3 may be different from the control electrode of the fifth transistor T5.

A concept of the embodiment of FIG. 4 replacing the reference voltage VREF applied to the input electrode of the reference voltage applying switching element T5 with the first power supply voltage ELVDD may be applied to the embodiment of FIG. 17. A concept of the embodiment of FIG. 5 replacing the light emitting element initialization voltage VAINT applied to the input electrode of the light emitting element initialization switching element T7 with the initialization voltage VINT may be applied to the embodiment of FIG. 17.

Figure 18:
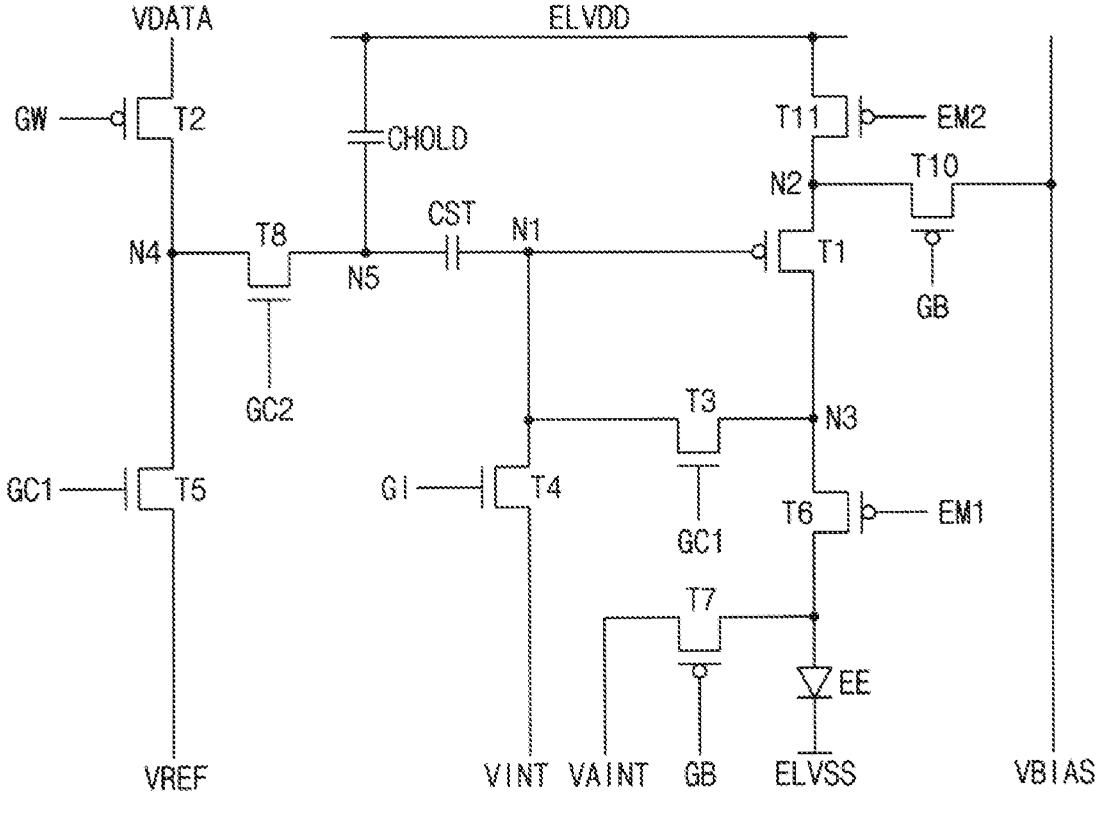
FIG. 18 is a circuit diagram illustrating an example of a pixel of the display panel of FIG. 1.

FIG. 18 is a circuit diagram illustrating an example of a pixel of the display panel 100 of FIG. 1.

The pixel according to the embodiment of FIG. 18 is substantially the same as the pixel of the previous embodiment explained referring to FIG. 17 except that a fifth transistor T5 is formed as the N-type transistor. Thus, the same reference numerals will be used to refer to the same or like parts as those described in the previous embodiment of FIG. 17 and any repetitive explanation concerning the above elements will be omitted for sake of brevity.

Referring to FIGS. 1, 2, 14, 17 and 18, the pixel may include a data initialization switching element T4 connected to a control electrode of a driving switching element T1 and applying an initialization voltage VINT to a control electrode N1 of the driving switching element T1.

Herein, the driving switching element T1 may be a P-type transistor and the data initialization switching element T4 may be an N-type transistor. For example, the driving switching element T1 may be an LTPS (low temperature polysilicon) thin film transistor. The data initialization switching element T4 may be an oxide thin film transistor.

In addition, the pixel may further include a threshold voltage compensation switching element T3 disposed between an output electrode of the data initialization switching element T4 and an output electrode of the driving switching element T1.

Herein, the threshold voltage compensation switching element T3 may be the N-type transistor. The threshold voltage compensation switching element T3 may be the oxide thin film transistor.

In addition, the pixel may further include a reference voltage applying switching element T5 connected to an input electrode of the first leakage compensation switching element T8.

The first leakage compensation switching element T8 and the reference voltage applying switching element T5 may N-type transistors. The first leakage compensation switching element T8 and the reference voltage applying switching element T5 may oxide thin film transistors.

The reference voltage applying switching element T5 may be the N-type transistor so that the current leakage at the first electrode of the storage capacitor CST may be reduced in the low frequency driving. Thus, the level of the data voltage VDATA charged at the storage capacitor CST may not be reduced due to the current leakage in the low frequency driving.

A concept of the embodiment of FIG. 4 replacing the reference voltage VREF applied to the input electrode of the reference voltage applying switching element T5 with the first power supply voltage ELVDD may be applied to the embodiment of FIG. 18. A concept of the embodiment of FIG. 5 replacing the light emitting element initialization voltage VAINT applied to the input electrode of the light emitting element initialization switching element T7 with the initialization voltage VINT may be applied to the embodiment of FIG. 18.

According to the embodiments, the pixel circuit includes the leakage compensation switching element T8 and T9 connected to the storage capacitor CST so that the current leakage may be reduced in the display apparatus supporting the low frequency driving and the variable frequency driving.

Thus, the flicker may not occur by the luminance difference according to the driving frequency due to the current leakage in the pixel circuit and the change of the driving frequency may not be recognized by the user by the luminance difference according to the driving frequency in the display apparatus supporting the low frequency driving and the variable frequency driving. Therefore, the display quality of the display apparatus supporting the low frequency driving and the variable frequency driving may be enhanced.

According to the display apparatus of the embodiments as explained above, the display quality of the display panel may be enhanced.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pixel circuit comprising:

a light emitting element;

a driving switching element configured to apply a driving current to the light emitting element;

a storage capacitor connected to a control electrode of the driving switching element;

a data voltage applying switching element configured to apply a data voltage to the storage capacitor;

a first leakage compensation switching element disposed between the storage capacitor and the data voltage applying switching element; and a bias capacitor that includes a first electrode connected to the control electrode of the driving switching element and a second electrode configured to receive a bias signal, wherein the data voltage applying switching element is connected to the first leakage compensation switching element in series, and the data voltage applying switching element and the first leakage compensation switching element are controlled by different control signals, respectively.

2. The pixel circuit of claim 1, wherein a low level of the bias signal is greater than a low level of a control signal applied to a control electrode of the data voltage applying switching element.

3. The pixel circuit of claim 1, wherein the bias signal has a plurality of pulses in a single frame.

4. The pixel circuit of claim 1, further comprising a reference voltage applying switching element connected to an input electrode of the first leakage compensation switching element, wherein the bias signal is substantially the same as a control signal applied to a control electrode of the reference voltage applying switching element.

5. A pixel circuit comprising:

a light emitting element;

a driving switching element configured to apply a driving current to the light emitting element;

a storage capacitor connected to a control electrode of the driving switching element;

a data voltage applying switching element configured to apply a data voltage to the storage capacitor;

a first leakage compensation switching element disposed between the storage capacitor and the data voltage applying switching element;

a first bias switching element that includes an input electrode configured to receive a bias voltage and an output electrode connected to an input electrode of the driving switching element; and a second bias switching element that includes an input electrode configured to receive a first power voltage and an output electrode connected to an input electrode of the driving switching element, wherein the data voltage applying switching element is connected to the first leakage compensation switching element in series and the data voltage applying switching element and the first leakage compensation switching element are controlled by different control signals, respectively.

6. The pixel circuit of claim 1, further comprising a data initialization switching element connected to the control electrode of the driving switching element and configured to apply an initialization voltage to the control electrode of the driving switching element, wherein the driving switching element is a P-type transistor, and wherein the data initialization switching element is an N-type transistor.

7. The pixel circuit of claim 6, further comprising a threshold voltage compensation switching element disposed between an output electrode of the data initialization switching element and an output electrode of the driving switching element, wherein the threshold voltage compensation switching element is an N-type transistor.

* * * * *